United States Patent
Li et al.

(10) Patent No.: US 10,135,329 B2
(45) Date of Patent: Nov. 20, 2018

(54) VIRTUAL IMPEDANCE COMPREHENSIVE CONTROL METHOD FOR INDUCTIVE POWER FILTERING SYSTEM

(71) Applicant: Hunan University, Changsha, Hunan (CN)

(72) Inventors: Yong Li, Hunan (CN); Qianyi Liu, Hunan (CN); Sijia Hu, Hunan (CN); Longfu Luo, Hunan (CN); Yijia Cao, Hunan (CN)

(73) Assignee: HUNAN UNIVERSITY, Changsha (CN)

( * ) Notice: Subject to any disclaimer, the term of this patent is extended or adjusted under 35 U.S.C. 154(b) by 29 days.

(21) Appl. No.: 15/264,541

(22) Filed: Sep. 13, 2016

(65) Prior Publication Data
US 2017/0353101 A1    Dec. 7, 2017

(30) Foreign Application Priority Data

Jun. 7, 2016    (CN) .......................... 2016 1 0396960

(51) Int. Cl.
*H02M 1/12*    (2006.01)
*H01F 38/14*    (2006.01)
(Continued)

(52) U.S. Cl.
CPC ............ *H02M 1/126* (2013.01); *H01F 38/14* (2013.01); *H02J 3/01* (2013.01); *H02M 1/12* (2013.01); *H02M 7/46* (2013.01); *H02M 7/537* (2013.01)

(58) Field of Classification Search
CPC .......... H02M 1/12; H02M 1/14; H02M 1/143; H02M 1/15; H02M 1/126; H02M 1/42; H02M 1/44; H02M 7/00; H02M 7/02; H02M 7/04; H02M 7/043; H02M 7/12; H02M 7/125; H02M 7/217; H02M 7/2176; H02M 7/219; H02M 7/44; H02M 7/48; H02M 7/4826; H02M 7/42; H02M 7/46;
(Continued)

(56) References Cited

U.S. PATENT DOCUMENTS 5,731,965 A * 3/1998 Cheng ....................... H02J 3/01
307/105

FOREIGN PATENT DOCUMENTS

CN    103595048 A  *  2/2014

OTHER PUBLICATIONS

English translation of CN103595048.*

* cited by examiner

*Primary Examiner* — Gustavo Rosario Benitez
*Assistant Examiner* — Carlos Rivera-Perez

(57) ABSTRACT

The disclosure discloses a virtual impedance comprehensive control method for an inductive power filtering (IPF) system. According to the disclosure, harmonic damping control at grid side and zero impedance control of filters are organically combined according to a technical problem which is unsolved and process difficulty in equipment manufacturing in an existing filtering method, so that the problem of performance reduction of passive filtering equipment caused by a change in an impedance parameter of a power grid system is solved on one hand, optimization control over a quality factor of the passive filtering equipment may be implemented to reduce dependence on an equipment production process level on the other hand, a quality factor of the single-tuned filters may meet a design requirement, and an overall filtering characteristic is further improved.

5 Claims, 8 Drawing Sheets

(51) Int. Cl.
*H02M 7/46* (2006.01)
*H02M 7/537* (2006.01)
*H02J 3/01* (2006.01)

(58) Field of Classification Search
CPC ........ H02M 7/483; H02M 7/487; H02M 7/53;
H02M 7/537; H02M 7/5395; H02M
7/5387; H02M 7/539; H02M 2007/2195;
H02M 2007/4815; H02M 2007/4835;
H02M 2001/0009; H02M 2001/0064;
H02M 2001/123; H01F 38/00; H01F
38/14; H02J 3/18; H02J 3/1807; H02J
3/1814; H02J 3/38; H02J 3/46; H02J
3/48; H02J 3/01
USPC ..... 363/15–21.03, 21.06, 21.1, 21.11, 21.14,
363/21.18, 26, 34, 35, 37, 39–48, 95–99,
363/123–127, 131–134; 323/205–211,
323/222–226, 247–255, 259, 262,
323/271–277, 280, 282–286, 351,
323/355–363; 307/105
See application file for complete search history.

VIRTUAL IMPEDANCE COMPREHENSIVE CONTROL METHOD FOR INDUCTIVE POWER FILTERING SYSTEM

CROSS-REFERENCE TO PRIOR APPLICATION

This application claims the benefit of Chinese Patent Application No. 201610396960.3 filed on Jun. 7, 2016, the contents of which are incorporated herein by reference.

TECHNICAL FIELD

The disclosure relates to the field of harmonic suppression of industrial rectifier systems, and in particular to a virtual impedance comprehensive control method for the inductive power filtering system, which combines harmonic damping control at grid side and quality factor control of the passive filtering device.

BACKGROUND

Due to the technical limitations of the power quality (PQ) management of the chemical industry, metallurgy and other energy-intensive enterprises with non-linear power loads, there are a series of PQ issues to public grid, such as harmonic pollution, low power factor and high operating loss.

In order to solve the PQ issues of industrial rectifier system, the main measures are passive power filtering (PPF) method and active power filtering (APF) method. The PPF is generally considered as an economic choice for PQ improvement because of its low investment cost. But it can only filter out the specific order harmonics, and the filtering performance will be seriously affected when the harmonic source changes dynamically. By adopting the APF method, it can realize the real-time tracking and the suppression of harmonic currents. However, the large-capacity APF has shortcomings of high investment cost, much maintenance workload and the like, and is unlikely to be popularized for use in a large scale.

In the recent years, an inductive power filtering (IPF) method was proposed for industrial DC power supply system. The IPF method not only suppresses the harmonic currents but also prevents harmonic current from flowing into the primary winding of the rectifier transformer, which means that it can reduce the effects of harmonic components on the transformer. However, it is worth noting that the PPF-based IPF method still has the risk of resonance. Especially for the industrial distribution network which has a high content of harmonic background voltage, the IPF method has a weak ability for damping the parallel/series harmonic resonance. Besides, the IPF method requires the dual zero impedance design for the filtering winding and filtering branches. During the practical transformer design, by adjusting the values of the short-circuit impedances, the value of the equivalent impedance of the filtering winding may, ideally, be approximately equal to 0. As for the single tuned filter, due to the limitation of the manufacture technics, cost control and the existence of the transmission line impedance, while the capacitor and the inductor have been well tuned at the considered harmonic frequency in the process of design and manufacture, the equivalent impedance $Z_{fn}$ of the filtering branches still exists as a nonzero resistance. It can be known after the investigation of the reactor manufacturers that, the cost price will increase tenfold as the resistance inherent in the filtering branches reduces tenfold. And the coil wire with larger cross-sectional area is needed for a inductor with a low internal resistance. Therefore, to satisfy the design value of the quality factor (Q) of the filtering branches, the fabricating cost of the filtering device gets higher, and the installed space is greatened as well. For the energy-intensive enterprises which have more considerations for the cost of investment, it causes difficulty on the promotion and realization of the IPF method.

SUMMARY

In view of this, the disclosure is intended to overcome the shortcoming of a conventional art and provide a virtual impedance comprehensive control method for an inductive power filtering system. On one hand, the effect of system impedance on passive filtering performance can be mitigated effectively, the influence of harmonic background voltage is reduced; and on the other hand, it can realize the control of the Q. The impedance of the passive power device can be optimally adjusted to further improve the filtering performance. In addition, the new inductively filtered rectifier transformer (IFRT) is able to solve the problems of loss and noise caused by harmonic current on itself.

The disclosure solves the problems by the following technical solution.

A virtual impedance comprehensive control method for an inductive power filtering system including:

providing an inductive power filtering system including an industrial power distribution network, a novel IFRT, an industrial rectifier load, a filtering branch and a current and voltage sensor; wherein the filtering branch includes a passive filtering device and a voltage source inverter (VSI), the passive filtering device is connected with the VSI through the current and voltage sensor in series, the novel IFRT has a three-winding structure, and its primary (grid) winding adopts the star wiring, and is connected with the power grid through system impedance; two secondary low-voltage windings of the novel IFRT adopt an inductive type or a self-coupling type according to whether there is an electrical connection between the two windings or not, and the passive filtering device consists of two sets of single-tuned filters with the series resonance characteristic; the VSI adopts a two-level topology, and its output voltage is required to meet the following control rule:

$$V_C = K \cdot \sum_{n=2}^{\infty} I_{Sn} + K_{Rn} \cdot \sum_{n=5,7} I_{fn}$$

where K is a harmonic damping control coefficient, $K_{Rn}$ is a zero-impedance control coefficient, $I_{Sn}$ and $I_{fn}$ are harmonic currents of grid side of the transformer and the filtering branch respectively, and $V_C$ is the voltage of the AC port of the inverter; and regulating the zero impedance control coefficient $K_{Rn}$ to change a magnitude of a total impedance value of a filtering winding and the passive filtering device to meet a zero impedance condition for implementation of inductive filtering, that is:

$$Z_{3n} + Z_{fn} \approx 0$$

where $Z_{3n}$ is equivalent impedance of the filtering winding of the novel IFRT, and $Z_{fn}$ is equivalent impedance of the filtering branch.

Furthermore, the virtual impedance comprehensive control method for the inductive power filtering system specifically includes the following steps:

Step 1: controlling harmonic damping of the inductive power filtering system to obtain first output signals;

Step 2: controlling zero impedance of the inductive power filtering system to obtain a second output signal;

Step 3: controlling the DC voltage of the inductive power filtering system to obtain a third output signal; and Step 4: superposing the first output signals, the second output signal and the third output signal to obtain a control signal, and performing Pulse Width Modulation (PWM) on the control signal to provide a pulse signal for a main circuit.

Furthermore, Step 1 specifically includes the following steps:

Step 11: sampling a voltage signal of phase A at grid side, and generating a synchronous phase angle to provide a phase reference for dq transformation by means of a phase-locked loop (PLL);

Step 12: sampling and causing current signals of phases A, B and C at the grid side to undergo dq transformation for which a phase reference is provided by a fundamental voltage signal and pass through a low-pass filter to obtain two groups of DC signals, performing dq inverse transformation to convert them into current under an abc coordinate to obtain a fundamental wave, and performing subtraction with the sampled current signals of the three phases to obtain harmonic current signals; and Step 13: multiplying the harmonic current signals by the harmonic damping coefficient to obtain the first output signals.

Furthermore, Step 2 specifically includes the following steps:

Step 21: sampling and causing current signals of phases a, b and c of the filtering branch to undergo dq transformation for which a phase reference is provided by a fifth harmonic voltage signal and pass through the low-pass filter, then performing dq inverse transformation to obtain fifth harmonic current, and multiplying the fifth harmonic current by a fifth zero impedance control coefficient;

Step 22: sampling and causing current signals of phases a, b and c of the filtering branch to undergo dq transformation for which a phase reference is provided by a seventh harmonic voltage signal and pass through the low-pass filter, then performing dq inverse transformation to obtain seventh harmonic current, and multiplying the seventh harmonic current by a seventh zero impedance control coefficient; and Step 23: superposing obtained signals to obtain the second output signal.

Furthermore, Step 3 specifically includes the following steps:

Step 31: sampling DC capacitive voltage of the inverter, and performing subtraction with reference voltage to obtain an active power control variable through a Proportion Integration (PI) controller;

Step 32: performing calibration with a fundamental voltage phase reference to obtain a three-phase voltage unit sinusoidal signal according to different wiring scheme for the transformer; and Step 33: multiplying the active power control variable and the three-phase voltage unit sinusoidal signal to obtain the third output signal.

Compared with the conventional art, the disclosure has beneficial effects as follows:

(1) harmonic damping control in a control part of the disclosure is equivalent to addition of virtual system impedance with a value K at grid side, and the value of the virtual impedance K is far more than original system impedance $L_S$, so that a harmonic damping capability higher than that of a conventional passive filtering system is achieved; and (2) zero impedance control in the control part of the disclosure may be considered as superposing of virtual resistance with a value $K_{Rn}$ to the filtering branch, $K_{Rn}$ is regulated into negative impedance to implement regulation of impedance of the filtering branch to achieve the quality factor required by design, meanwhile, such control may reduce dependence on a passive filtering device manufacturing process requirement under the condition of ensuring the filtering effect, reduce investment cost, reduce a structural size of a reactor and save an occupied space, it is worth noting that zero impedance control may independently control the passive filtering device to accurately tune it at a design frequency to further improve the inductive filtering effect without superposing with harmonic damping control, and at this moment, the inverter only bears extremely low harmonic voltage, and a requirement on capacity is lower.

DESCRIPTIONS ABOUT DRAWING REFERENCE SIGNS

1: industrial power distribution network; 2: novel inductively filtered rectifier transformer; 3: industrial rectifier load; 4: passive filtering device; 5: single-tuned filter bank; 6: current and voltage sensor; 7: voltage source inverter;

8: inductive type for secondary windings; 9: self-coupling type for secondary windings;

10: single-phase equivalent circuit of novel inductively filtered recitifier transformer;

11: single-phase equivalent circuit of nonlinear load; 12: single-phase equivalent circuit of filtering branch; 13: harmonic damping control; 14: zero-impedance control; and 15: DC voltage control.

DETAILED DESCRIPTION OF THE EMBODIMENTS

In order to make the purpose, characteristics and advantages of the disclosure more obvious and easier to understand, the technical solution of the disclosure will be described below with reference to the drawings and specific embodiments in detail. It is important to point out that the described embodiments are not all embodiments but only a part of embodiments of the disclosure, and all other embodiments obtained by those skilled in the art based on the embodiments in the disclosure without creative work shall fall within the scope of protection of the disclosure.

Figure 1:
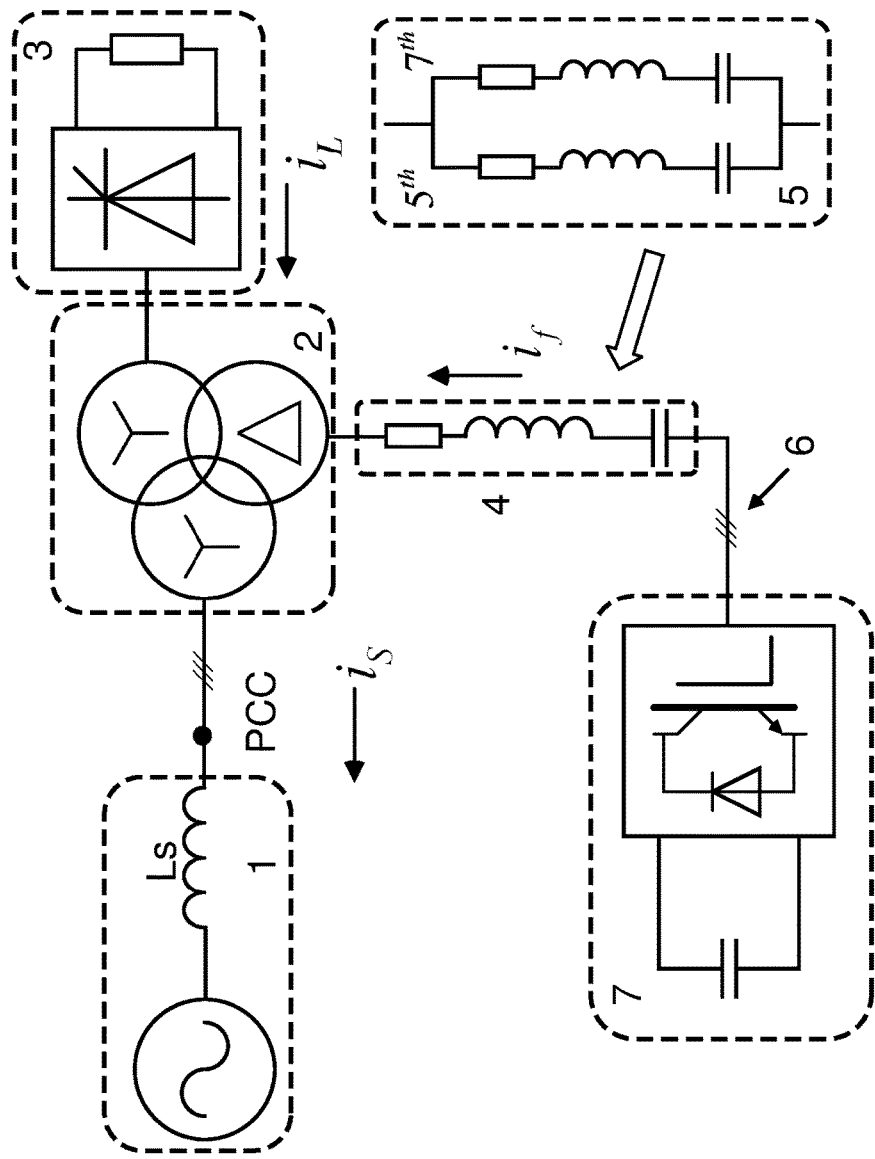
FIG. 1 is a schematic diagram of an inductive power filtering system according to the disclosure (with the inductive type as an example)

FIG. 1 shows an inductive power filtering system, for example, for secondary winding with inductive type, including a novel inductively filtered recitifier (IFRT) transformer 2 which is specially designed and a filtering branch. The filtering branch includes a passive filtering device 4 and a voltage source inverter 7, the passive filtering device 4 consists of single-tuned filter banks 5 turned at fifth and seventh harmonic frequencies, the voltage source inverter 7 is also required to be connected with a corresponding control circuit, and a semaphore required in the control circuit is sampled by a current and voltage sensor 6.

A grid winding of the novel IFRT 2 adopts a star wiring, and is connected with a power grid through system impedance $L_S$; a load winding in secondary windings adopts the star wiring, and is connected with an industrial rectifier load; and a filtering winding in the secondary windings adopts a delta wiring, and three parallel filtering branches are connected with the filtering winding in the star wiring. The novel IFRT is specially designed to make the equivalent impedance of the filtering winding in the secondary windings approximate to 0.

Figure 2:
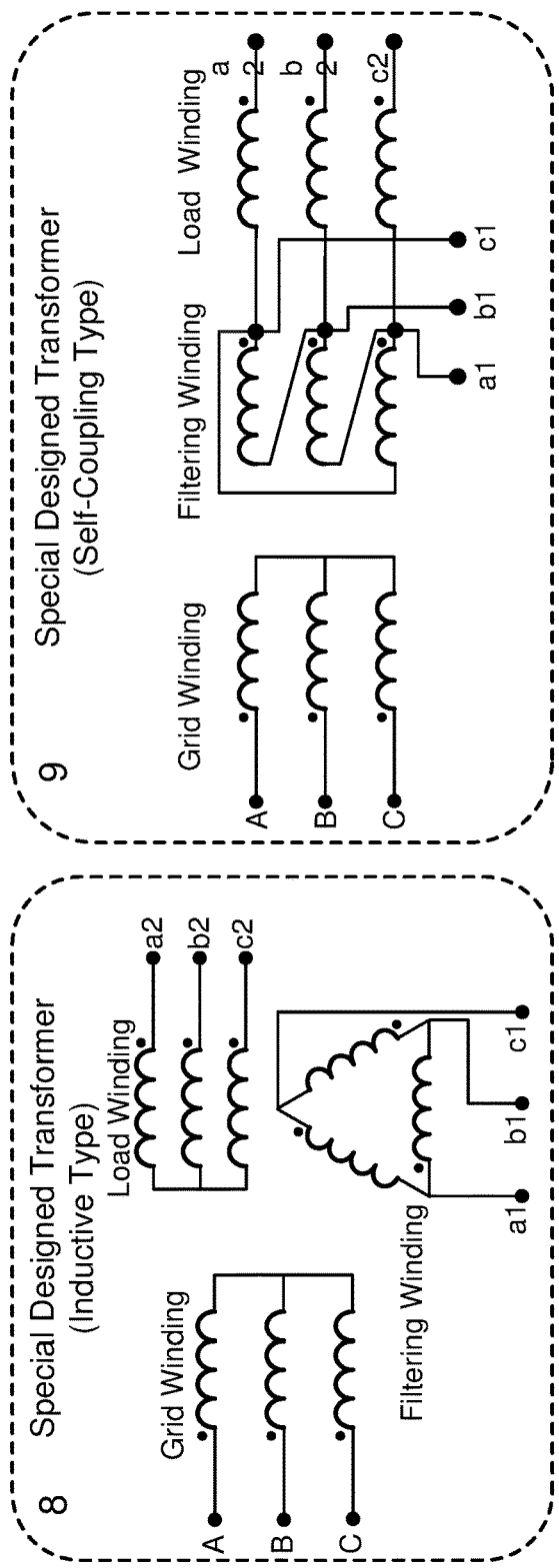
FIG. 2 is a wiring scheme diagram of two optional wiring forms of secondary windings of an inductive power filtering system according to the disclosure.

As shown in FIG. 2, the two secondary windings of the novel IFRT in the disclosure may adopt inductive 8 and self-coupling 9 wiring schemes according to whether there is an electrical connection between the two windings or not.

Specifically, the inductive type 8 is to connect the industrial rectifier load to a star winding of the load winding and connect the three filtering branches in parallel with a delta winding of the filtering winding.

Specifically, the self-coupling type 9 is to connect the industrial rectifier load to an extended winding of the load winding and connect the three filtering branches in parallel with three intersections of the extended winding and the delta winding, and at this moment, the delta winding serves as the filtering winding.

A harmonic damping control principle of the disclosure will be introduced below.

Figure 3:
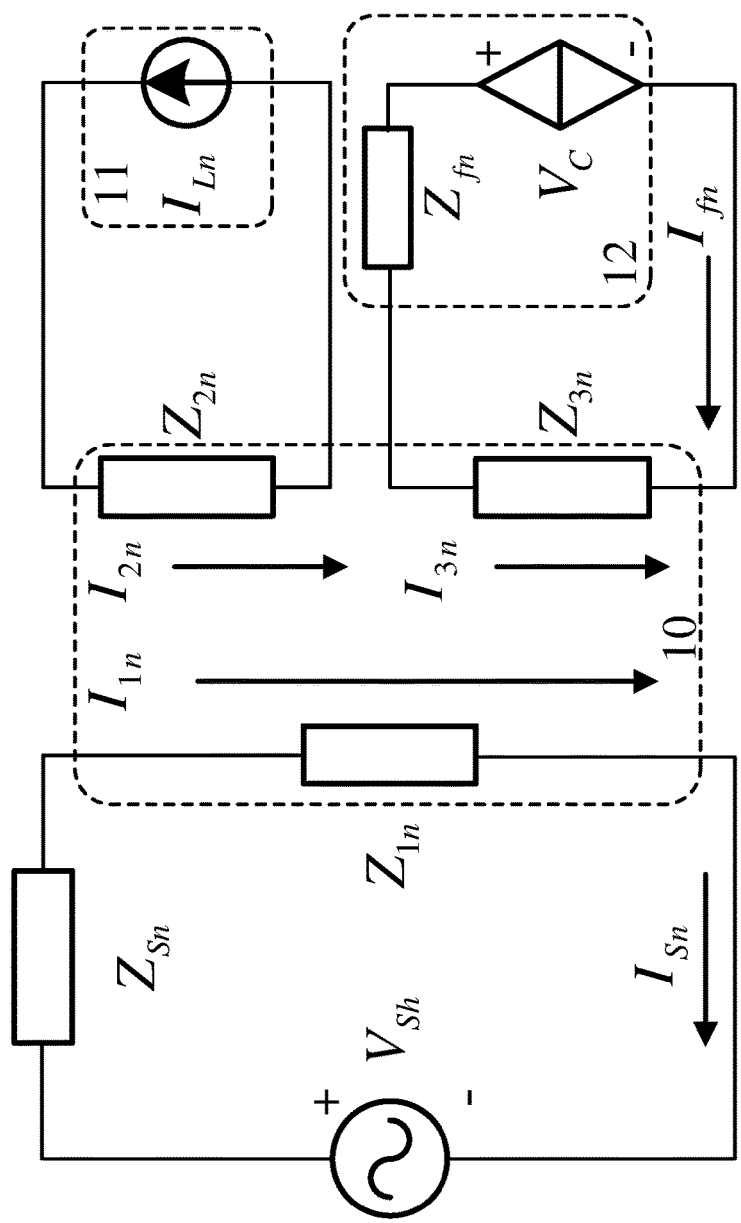
FIG. 3 is a diagram of a harmonic damping control principle of a virtual impedance control comprehensive method for an inductive power filtering system according to the disclosure (with the inductive type as an example)
Figure 4:
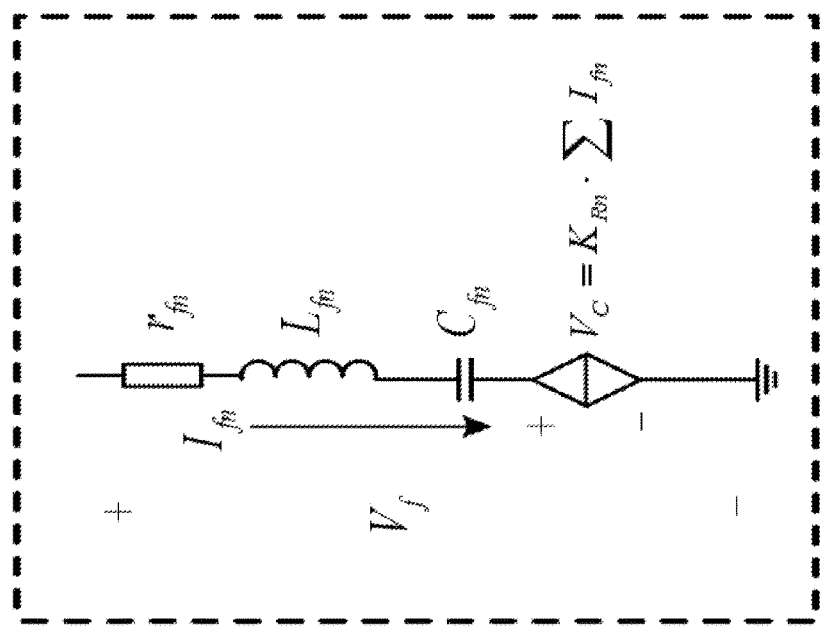
FIG. 4 is a diagram of a zero impedance control principle of a virtual impedance control comprehensive method for an inductive power filtering system according to the disclosure.
Figure 5:
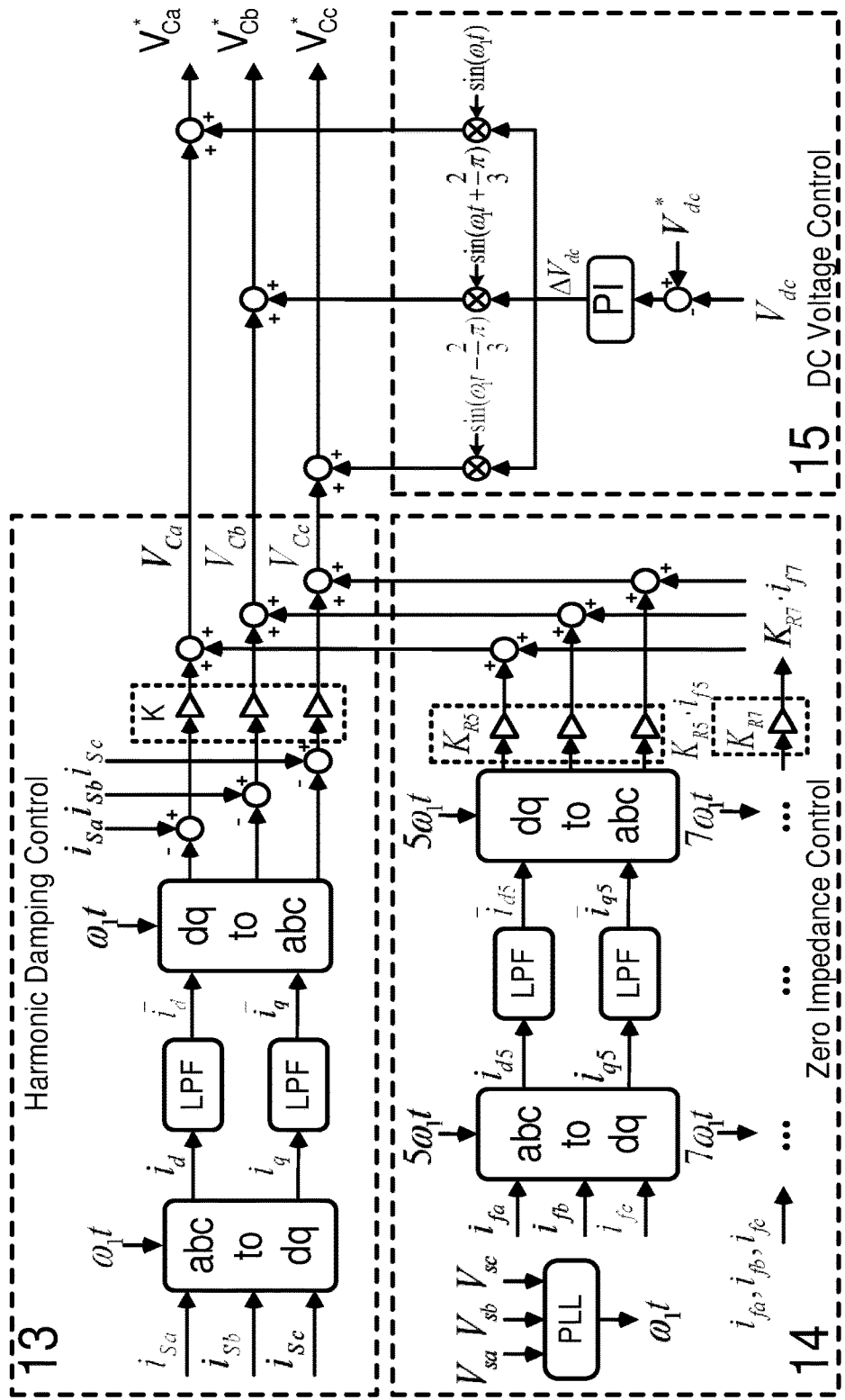
FIG. 5 is a diagram of a virtual impedance comprehensive control strategy for an inductive power filtering system according to the disclosure.

FIG. 3 is a single-phase equivalent circuit according to the disclosure (with inductive wiring as an example), FIG. 4 is a diagram of a zero impedance control principle and FIG. 5 is a diagram of a virtual impedance comprehensive control principle. Under the control principle shown in FIG. 5, the voltage source inverter may be equivalent to a harmonic current controlled voltage source (HCCVS), and the AC port voltage is:

$$V_C = K \cdot \sum_{n=2}^{\infty} I_{Sn} + K_{Rn} \cdot \sum_{n=5,7} I_{fn} \quad (1)$$

where K is a harmonic damping control coefficient (equivalent to virtual impedance, connected in series with grid side, with a value K); $K_{Rn}$ is a zero impedance control coefficient (equivalent to virtual negative impedance, connected in series with the filtering branch, with a value $K_{Rn}$), $I_{Sn}$ and $I_{fn}$ are harmonic current of a primary side (grid side) of the transformer and the filtering branch respectively; and $V_C$ is the voltage of the AC output port of the inverter.

According to the theory of multi-winding transformer and the principle of transformer magnetic potential balance, the following equation can be obtained to reflect the impact of the load current $I_{Ln}$ and the harmonic background voltage $V_{Sn}$ on the grid side current $I_{Sn}$ i.e., $$I_{Sn} = \frac{N_3^2}{(Z_{3n} + Z_{fn}) \cdot N_1^2 + (Z_{1n} + Z_{Sn}) \cdot N_3^2 + K \cdot N_1 N_3} \cdot V_{Sn} - \frac{(Z_{3n} + Z_{fn}) \cdot N_1 N_2}{(Z_{3n} + Z_{fn}) \cdot N_1^2 + (Z_{1n} + Z_{Sn}) + N_3^2 + K \cdot N_1 N_3} \cdot I_{Ln} \quad (2)$$

where $N_1$, $N_2$ and $N_3$ are the numbers of turns of the grid-side winding, load winding and filtering winding of the novel IFRT respectively; $Z_{Sn}$ and $V_{Sn}$ are system impedance and harmonic background voltage of an industrial power distribution network; $Z_{1n}$ and $Z_{3n}$ are equivalent impedance of the grid side winding and filtering winding of the novel IFRT; and $Z_{fn}$ is equivalent impedance of the passive filtering device at a harmonic frequency.

From expression (2), it can be seen that the antecedent in expression (2) is 0 on the condition that $Z_{3n}+Z_{fn}=0$; while the harmonic damping control coefficient K may be regulated to well suppress the harmonic background voltage in the industrial power distribution network.

The zero impedance control principle is as follows:

at an nth (n=5 or 7) harmonic frequency, voltage of the filtering circuit branch is as follows:

$$V_{fn} = \underbrace{\left( j\omega_n L_{fn} - j\frac{1}{\omega_n C_{fn}} + r_{fn} \right)}_{Z_{fn}} \cdot I_{fn} + \underbrace{\frac{K_{Rn} \cdot I_{fn}}{V_C}}_{} \quad (3)$$

where $\omega_n$ is the nth harmonic angular frequency, $L_{fn}$ and $C_{fn}$ are reactance and capacitance values of the nth single-tuned filter, and $r_{fn}$ is internal resistance of a reactor and a transmission line.

Assuming the worst case, the parameters of the passive power device deviate its design value a little, the (3) can be further simplified, that is $$V_{fn} = \left( \underbrace{\frac{r_{fn} + j\omega_n L_{tn}}{Z_{ftn}} + K_{Rn}} \right) \cdot I_{fn} \quad (4)$$

In the equation, it satisfies that, $\omega_n L_{tn} = \omega_n L_{fn} - (1/\omega_n C_{fn})$ and $Z_{fn} = |Z_{fn}| \angle \varphi$ (note: φ is so small that it is close to 0, but it cannot be ignored). The real component of $Z_{fn}$ is $r_{fn}$, the imaginary component is $j\omega_n L_{tn}$. If the $K_{Rn}$ is controlled to be $-|Z_{fn}|$, and then the output signal is controlled to be lagged original signal behind a specific angle (φ), the voltage of the filtering branches will be 0, which means that the total impedance of the filtering branches is 0. Besides, the Q of the single tuned filter tends to be infinity, and the frequency selectivity will be better. $K_{Rn}$ can be considered as a virtual negative impedance connected with the filtering branches in series, and the virtual impedance is capacitive. In addition, the zero-impedance control coefficient $K_{Rn}$ can be adjusted properly as needed to reach the design value of Q, and a satisfactory harmonic blocking performance can be realized.

Referring to FIGS. 7-10, a virtual impedance comprehensive control method for the inductive power filtering system will be specifically described below.

The control method is mainly divided into four parts: harmonic damping control 13, zero impedance control 14, DC voltage control 15 and signal modulation.

(1) Harmonic Damping Control

1): a voltage signal of phase A at grid side is sampled, and a synchronous phase angle is generated to provide a phase reference for a control circuit through a phase-locked loop;

2): current signals of phases A, B and C at grid side are sampled and caused to undergo dq transformation for which a phase reference is provided by a fundamental voltage signal and pass through a low-pass filter (LPF) to obtain two groups of DC signals, dq inverse transformation is performed to convert them into current under an ABC coordinate system to obtain a fundamental wave, and subtraction is performed with the sampled current signals of the three phases to obtain harmonic current signals; and 3): the harmonic current signals are multiplied by the harmonic damping coefficient to obtain output signals 1.

(2) Zero Impedance Control

1): current signals of phases a, b and c of the filtering branch are sampled and caused to undergo dq transformation for which a phase reference is provided by a fifth harmonic voltage signal and pass through the LPF, then dq inverse transformation is to performed to obtain fifth harmonic current, and the fifth harmonic current is multiplied by a fifth zero impedance control coefficient;

2): current signals of phases a, b and c of the filtering branch are sampled and caused to undergo dq transformation for which a phase reference is provided by a seventh harmonic voltage signal and pass through the LPF, then dq inverse transformation is performed to obtain seventh harmonic current, and the seventh harmonic current is multiplied by a seventh zero impedance control coefficient; and 3): obtained signals are superposed to obtain output signal 2.

(3) DC Voltage Control

1): DC voltage of the inverter is sampled, and subtraction is performed with reference voltage to obtain an active power control variable through a PI controller;

2): calibration is performed with a fundamental voltage phase reference to obtain a three-phase voltage unit sinusoidal signal according to different wiring type for the transformer; and 3): the active power control variable and the three-phase voltage unit sinusoidal signal are multiplied to obtain output signal 3.

(4) Signal Modulation

1): output signals 1, output signal 2 and output signal 3 are superposed to obtain a control signal; and 2) PWM is performed on the control signal to provide a pulse signal for a main circuit.

Figure 6:
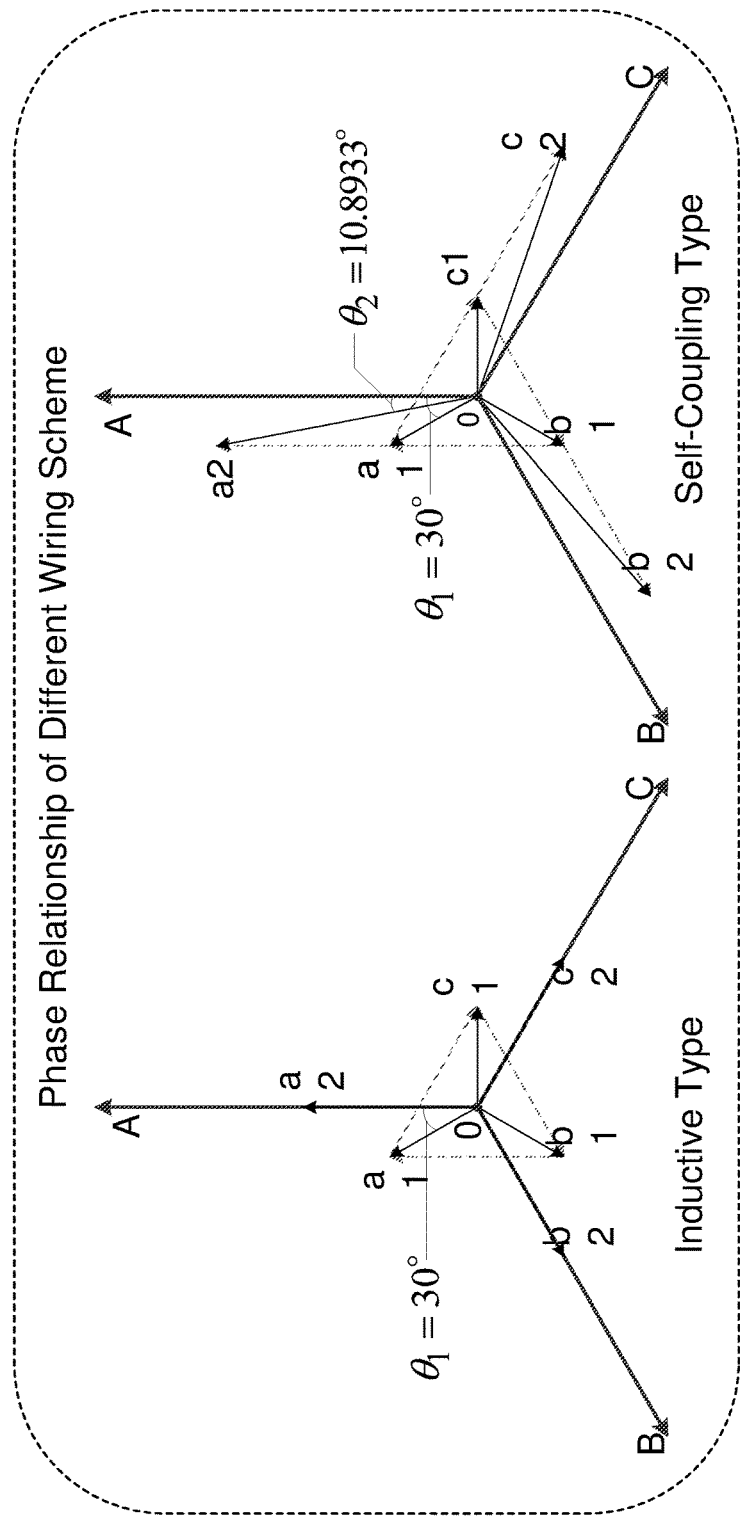
FIG. 6 is a voltage and phase relationship diagram of two different wiring type for a transformer of an inductive power filtering system subjected to the virtual impedance comprehensive control according to the disclosure.
Figure 7:
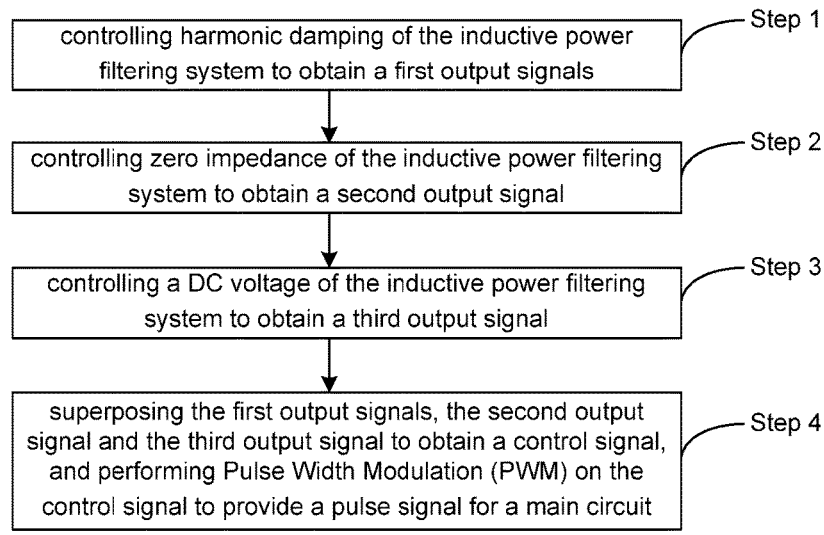
FIG. 7 illustrates the virtual impedance comprehensive control method for the inductive power filtering system.
Figure 8:
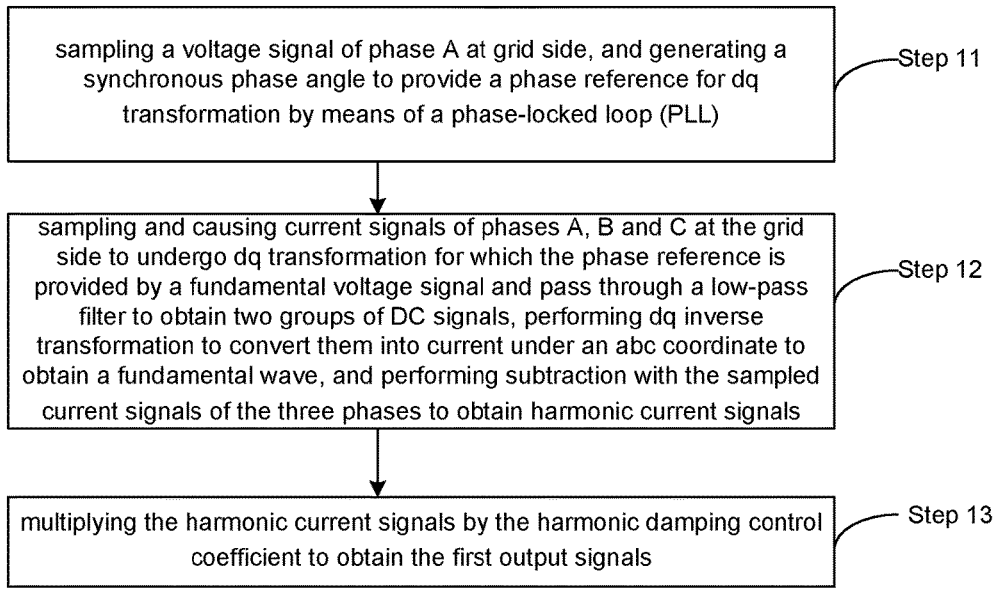
FIG. 8 illustrates how to control harmonic damping of the inductive power filtering system to obtain a first output signals.
Figure 9:
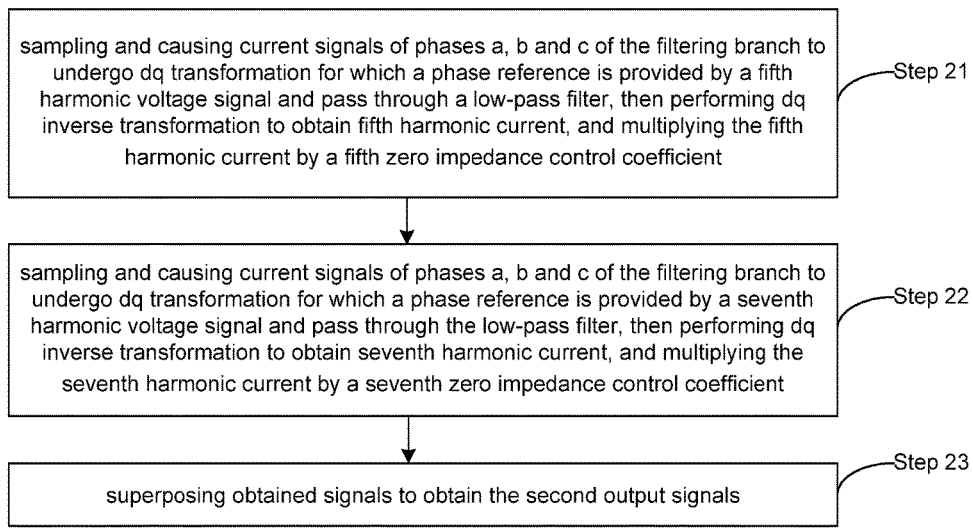
FIG. 9 illustrates how to control zero impedance of the inductive power filtering system to obtain a second output signals.
Figure 10:
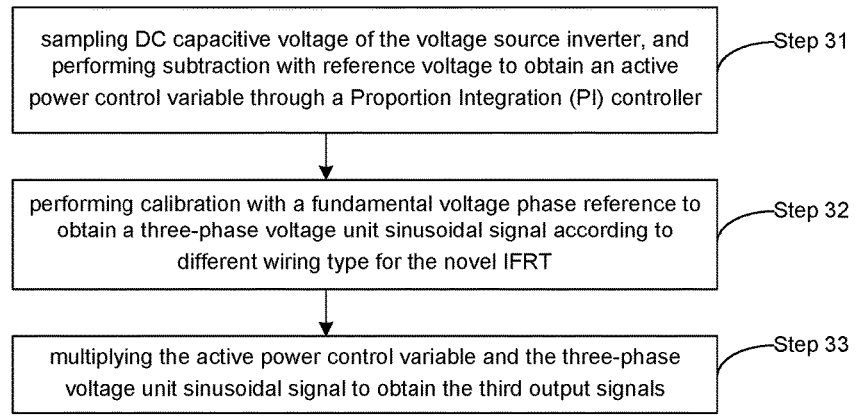
FIG. 10 illustrates how to control a DC voltage of the inductive power filtering system to obtain a third output signals.

FIG. 6 is a voltage and phase relationship diagram of two optional wiring type for an IFRT according to the disclosure, and it can be seen that voltage of the filtering winding is $\theta_1$ ahead of voltage of the grid winding under the wiring scheme shown in FIG. 2. The angle may be configured to determine a calibration phase of the output signal of direct current stabilized voltage control in the control manner, and the stabilized voltage active power control variable and the fundamental current of the filtering branch circuit are required to be in-phase.

Compared with the conventional art, the disclosure has beneficial effects as follows:

(1) harmonic damping control in a control part of the disclosure is equivalent to addition of virtual system impedance with a value K at grid side, and the value of the virtual impedance K is far more than original system impedance $L_S$, so that a harmonic damping capability higher than that of a conventional passive filtering system is achieved; and (2) zero impedance control in the control part of the disclosure may be considered as superposing of virtual resistance with a value $K_{Rn}$ to the filtering branch, $K_{Rn}$ is regulated into negative impedance to implement regulation of impedance of the filtering branch to achieve the quality factor required by design, meanwhile, such control may reduce dependence on a passive filtering device manufacturing process requirement under the condition of ensuring the filtering effect, reduce investment cost, reduce a structural size of a reactor and save an occupied space, it is worth noting that zero impedance control may independently control the passive filtering device to accurately tune it at a design frequency to further improve the inductive filtering effect without superposing with harmonic damping control, and at this moment, the inverter only bears extremely low harmonic voltage, and a requirement on capacity is lower.

The abovementioned embodiments are specifically described in detail to express only some implementation modes of the disclosure and not thus intended to limit the scope of the disclosure. It is important to point out that those skilled in the art may also make a plurality of transformations and improvements without departing from the concept of the disclosure, and these transformations and improvements fall within the scope of protection of the disclosure. Therefore, the scope of protection of the disclosure shall be subject to the appended claims.

What is claimed is:

1. A virtual impedance comprehensive control method for an inductive power filtering system, comprising:

providing the inductive power filtering system comprising an industrial power distribution network, a novel inductively filtered rectifier transformer (IFRT), an industrial rectifier load, a filtering branch, and a current and voltage sensor, wherein the filtering branch comprises a passive filtering device and a voltage source inverter, the passive filtering device is connected with the voltage source inverter through the current and voltage sensor, the novel IFRT has a three-winding structure, and its grid winding adopts a star wiring, and is connected with a power grid through system impedance; two secondary windings of the novel IFRT adopt an inductive type or a self-coupling type according to whether there is an electrical connection between the two windings or not, and the passive filtering device consists of two banks of single-tuned filters with a series resonance characteristic; the voltage source inverter adopts a two-level topology, and AC port voltage of the voltage source inverter is required to meet the following control rule:

$$V_C = K \cdot \sum_{n=2}^{\infty} I_{Sn} + K_{Rn} \cdot \sum_{n=5,7} I_{fn}$$

where K is a harmonic damping control coefficient, $K_{Rn}$ is a zero impedance control coefficient, $I_{Sn}$ and $I_{fn}$ are harmonic current of grid side of the novel IFRT and the filtering branch respectively, and $V_C$ is the voltage of the AC port of the voltage source inverter; and regulating the zero impedance control coefficient $K_{Rn}$ to change a magnitude of a total impedance value of a filtering winding and the passive filtering device to meet a zero impedance condition for implementation of inductive filtering, that is:

$$Z_{3n}+Z_{fn}\approx 0$$

where $Z_{3n}$ is equivalent impedance of the filtering winding of the novel IFRT, and $Z_{fn}$ is equivalent impedance of the filtering branch; wherein voltage of the filtering branch is as follows:

$$V_{fn} = \left(\underbrace{r_{fn} + j\omega_n L_{tn}}_{Z_{fn}} + K_{Rn}\right) \cdot I_{fn},$$

Where $\omega_n L_{tn} = \omega_n L_{fn} - (1/\omega_n C_{fn})$, $\omega_n$ is the nth harmonic angular frequency, $L_{fn}$ and $C_{fn}$ are reactance and capacitance values of the nth single-tuned filter, and $r_{fn}$ is internal resistance of a reactor and a transmission line; the $K_{Rn}$ is controlled to be $-|Z_{fn}|$, and then the voltage of the filtering branch is 0.

2. The virtual impedance comprehensive control method for the inductive power filtering system according to claim 1, wherein the virtual impedance comprehensive control method for the inductive power filtering system specifically comprises the following steps:

Step 1: controlling harmonic damping of the inductive power filtering system to obtain a first output signals;

Step 2: controlling zero impedance of the inductive power filtering system to obtain a second output signals;

Step 3: controlling a DC voltage of the inductive power filtering system to obtain a third output signals; and Step 4: superposing the first output signals, the second output signals and the third output signals to obtain a control signal, and performing Pulse Width Modulation (PWM) on the control signal to provide a pulse signal for a main circuit.

3. The virtual impedance comprehensive control method for the inductive power filtering system according to claim 2, wherein Step 1 specifically comprises the following steps:

Step 11: sampling a voltage signal of phase A at grid side, and generating a synchronous phase angle to provide a phase reference for dq transformation by means of a phase-locked loop (PLL);

Step 12: sampling and causing current signals of phases A, B and C at the grid side to undergo dq transformation for which the phase reference is provided by a fundamental voltage signal and pass through a low-pass filter to obtain two groups of DC signals, performing dq inverse transformation to convert them into current under an abc coordinate to obtain a fundamental wave, and performing subtraction with the sampled current signals of the three phases to obtain harmonic current signals; and Step 13: multiplying the harmonic current signals by the harmonic damping control coefficient to obtain the first output signals.

4. The integrated virtual impedance control method for the inductive power filtering system according to claim 2, wherein Step 2 specifically comprises the following steps:

Step 21: sampling and causing current signals of phases a, b and c of the filtering branch to undergo dq transformation for which a phase reference is provided by a fifth harmonic voltage signal and pass through a low-pass filter, then performing dq inverse transformation to obtain fifth harmonic current, and multiplying the fifth harmonic current by a fifth zero impedance control coefficient;

Step 22: sampling and causing current signals of phases a, b and c of the filtering branch to undergo dq transformation for which a phase reference is provided by a seventh harmonic voltage signal and pass through the low-pass filter, then performing dq inverse transformation to obtain seventh harmonic current, and multiplying the seventh harmonic current by a seventh zero impedance control coefficient; and Step 23: superposing obtained signals to obtain the second output signals.

5. The integrated virtual impedance control method for the inductive power filtering system according to claim 2, wherein Step 3 specifically comprises the following steps:

Step 31: sampling DC capacitive voltage of the voltage source inverter, and performing subtraction with reference voltage to obtain an active power control variable through a Proportion Integration (PI) controller;

Step 32: performing calibration with a fundamental voltage phase reference to obtain a three-phase voltage unit sinusoidal signal according to different wiring type for the novel IFRT; and Step 33: multiplying the active power control variable and the three-phase voltage unit sinusoidal signal to obtain the third output signals.

* * * * *